US009945235B2

(12) United States Patent
Berard et al.

(10) Patent No.: US 9,945,235 B2
(45) Date of Patent: Apr. 17, 2018

(54) CONING RESISTANT ROTOR FOR A SEAL ASSEMBLY

(71) Applicant: Eaton Corporation, Cleveland, OH (US)

(72) Inventors: Gerald Maurice Berard, North Providence, RI (US); Edward N. Ruggeri, Westport, MA (US)

(73) Assignee: Eaton Intelligent Power Limited, Dublin (IE)

( * ) Notice: Subject to any disclaimer, the term of this patent is extended or adjusted under 35 U.S.C. 154(b) by 445 days.

(21) Appl. No.: 14/362,789

(22) PCT Filed: Dec. 21, 2012

(86) PCT No.: PCT/US2012/071369
§ 371 (c)(1),
(2) Date: Jun. 4, 2014

(87) PCT Pub. No.: WO2013/106194
PCT Pub. Date: Jul. 18, 2013

(65) Prior Publication Data
US 2014/0334933 A1 Nov. 13, 2014

Related U.S. Application Data

(60) Provisional application No. 61/578,933, filed on Dec. 22, 2011, provisional application No. 61/647,825, filed on May 16, 2012.

(51) Int. Cl.
*F16J 15/34* (2006.01)
*F01D 5/30* (2006.01)
(Continued)

(52) U.S. Cl.
CPC .............. *F01D 5/303* (2013.01); *B23P 19/00* (2013.01); *F01D 11/003* (2013.01);
(Continued)

(58) Field of Classification Search
CPC ..... F01D 5/303; F01D 11/003; F16J 15/3468; F05D 2250/75
See application file for complete search history.

(56) References Cited

U.S. PATENT DOCUMENTS 2,761,712 A 9/1956 Ecker
5,183,270 A 2/1993 Alten et al.
(Continued)

FOREIGN PATENT DOCUMENTS

EP 2236870 A2 10/2010
SU 844872 A1 7/1981
(Continued)

OTHER PUBLICATIONS

European Patent Office, International Search Report and Written Opinion issued in counterpart International Application No. PCT/US2012/071369, dated Mar. 25, 2013.

*Primary Examiner* — Logan Kraft
*Assistant Examiner* — Jason Davis
(74) *Attorney, Agent, or Firm* — Fishman Stewart PLLC

(57) ABSTRACT

A coning-resistant rotor and a seal assembly including a coning-resistant rotor are disclosed. An embodiment of the rotor includes a rotor base, a rotor head, and an axially-extending web interposed between the rotor base and rotor head, wherein the web includes axial and radial web regions defined by at least one circumferential groove provided in the web. In another embodiment, a rotor base includes a sealing surface and an inner diameter surface, and the inner diameter surface includes a channel with a taper.

24 Claims, 5 Drawing Sheets

(51) Int. Cl.
  *F01D 11/00* (2006.01)
  *B23P 19/00* (2006.01)
(52) U.S. Cl.
  CPC ....... *F16J 15/3468* (2013.01); *F05D 2250/75* (2013.01); *Y10T 29/49321* (2015.01)

(56) References Cited

U.S. PATENT DOCUMENTS 5,609,342 A    3/1997  Peterson et al.
5,626,347 A    5/1997  Ullah
6,655,695 B1 * 12/2003 Sund ................... F01D 11/003
                                                  277/358

FOREIGN PATENT DOCUMENTS

WO    97/26475 A1    7/1997
WO    02/064951 A1   8/2002

* cited by examiner

CONING RESISTANT ROTOR FOR A SEAL ASSEMBLY

CROSS-REFERENCE TO RELATED APPLICATIONS

This application is a national stage filing based upon International PCT Application No. PCT/US2012/071369, with an international filing date of Dec. 21, 2012, which claims the benefit of the filing date of U.S. Provisional Patent Application No. 61/578,933, filed Dec. 22, 2011, and U.S. Provisional Patent Application No. 61/647,825, filed May 16, 2012, the entire disclosures of which are incorporated herein by reference.

TECHNICAL FIELD

The present invention relates generally to rotors used in seal assemblies, including rotors suitable for a gas turbine engine.

BACKGROUND

Rotors mounted on a rotating shaft are generally clamped down in order to resist high torque loads and to maintain closure of the shaft-mounted components. As a result of the clamping force, distortions may be transmitted to the rotor face since the mounting surfaces may not be uniform, rigid, or perfectly square to the shaft axis. These distortions are often referred to as "coning." However, for correct or proper operation, the rotor face should be maintained flat and square to the shaft within a few helium light bands. In addition to clamping induced distortion, rotation of the shaft and heating of the rotor from the seal ring assembly can additionally contribute to undesirable rotor distortion.

SUMMARY

A coning-resistant rotor and a seal assembly including a coning-resistant rotor are disclosed. An embodiment of the rotor includes a rotor base, a rotor head, and an axially-extending web interposed between the rotor base and rotor head, wherein the web includes axial and radial web regions defined by at least one circumferential groove. In another embodiment, a rotor base includes a sealing surface and an inner diameter surface including a channel having a taper.

BRIEF DESCRIPTION OF THE DRAWINGS

Embodiments of the invention will now be described, by way of example, with reference to the accompanying drawings.

DETAILED DESCRIPTION

Reference will now be made in detail to embodiments of the present disclosure, examples of which are described herein and illustrated in the accompanying drawings. While the invention may be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
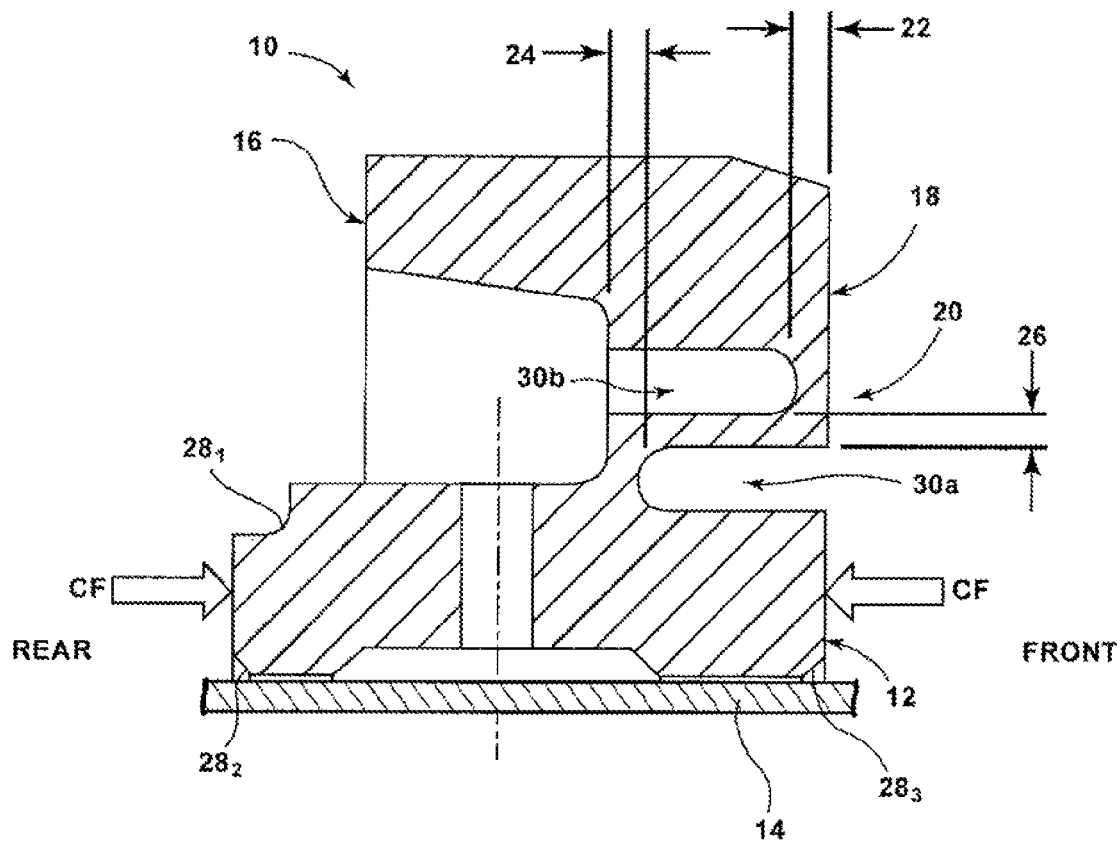
FIG. 1 illustrates a cross-sectional view of a coning-resistant rotor according to an embodiment of the disclosure.

A coning-resistant rotor 10 according to an embodiment of the disclosure is generally illustrated in FIG. 1. The rotor may be generally ring-shaped in structure and may have a rotor base 12 adapted or configured for connection to, or engagement with, a rotor shaft 14 that is rotatable about an axis having a centerline ($C_L$).

In an embodiment, a rotor head 16, which may include a rotor face 18, is connected to the rotor base 12 by an axially-extending web 20. The axial web is provided between the rotor head 16 and rotor base 12, and may, for example and without limitation, have an "S" or a "gooseneck" type shape, viewed in cross-section. As generally illustrated in FIG. 1, an axial, or axially-directed, clamping force (CF) may be applied to the front and rear of the rotor base 12. It is noted that for some applications, the anticipated clamping force (CF) applied to the rotor base may be as high as 40,000 lbs. (18143.695 kg.), and for certain applications may even range as high as 90,000 lbs. (40823.313 kg.) or more. The clamping force (CF) may induce a measure of distortion of the rotor face 18, which may cause the rotor face 18 to go out of square with respect to the axis of rotation and/or a warping of the sealing surface of the rotor face 18. However, in connection with the present disclosure, such distortion(s) may be reduced, and even significantly reduced, by introducing the slenderness and flexibility of axial web regions 22, 24 and/or radial web regions 26—which may be defined by at least one axially-extending, circumferential groove 30. In this context, the term "groove" is intended to encompass a wide variety of formations or configurations in which material is removed or absent. In the illustrated embodiment, two grooves 30 are provided. The groove designated 30a is shown formed into the web 20 from a front direction of the rotor, while the groove designated 30b is shown formed into the web 20 from an opposing (rear) direction. However, more grooves (whether the same size, smaller or larger, or shape) in various forms or configurations may be introduced (on the front and/or rear side) to affect and/or reduce distortion further. Additionally, as generally shown in FIG. 1, for embodiments, a first axially-extending circumferential groove (formed into the web from a front or rear portion of the rotor, e.g., 30a) may be positioned at a different radial distance/position (e.g., from the bottom of base portion 12) than another axially-extending circumferential groove (formed into the web from a front or rear portion of the rotor, e.g., 30b)—moreover, a span between such grooves may form a radial web region (e.g., radial web region 26).

The inclusion of the axially-extending web 20 can, among other things, permit the rotor base 12 to move (e.g., back and forth to a reasonable degree), with a lessened or zero functional impact on the rotor head 16, and consequently the intended positioning or "squareness" of the rotor face 18. For some applications, the amount of undesirable distortion with respect to the rotor face 18 may be significantly reduced by introducing the slenderness and flexibility of axial and radial web regions, via circumferential grooves. With reference to FIG. 1, base 12 may include at least one angled, tapered, and/or curved portion (e.g., $28_1$, $28_2$, and $28_3$), such as generally depicted in FIG. 1.

Optimization of the web 20, groove 30, and rotor 10 configuration or geometry may be accomplished via, for example, finite element analysis techniques, and may "tune" the design to anticipated or desired operating conditions. Additionally, embodiments of the present disclosure allow for radial balancing of inertial forces by hinging about front and rear axial web regions 22, 24, respectively, in the web 20. While for some embodiments, such as illustrated in FIG. 1, a front axial web region 22 (e.g., formed by a groove, such as groove 30b) and rear axial web region 24 (e.g., formed by groove, such as groove 30a) may be similar in size and shape, for other embodiments the size (e.g., open volume within the web space), the shape, or both the size and shape of such regions may be configured entirely differently. It is noted that extending the web 20 in the axial direction (i.e., substantially parallel to the rotor shaft 14, such as along web region 26 in the web 20) can substantially reduce or prevent axial deflection of the rotor face 18, particularly when compared to conventional designs that include distortion-reducing features (which may be more of a "radial" nature).

Figure 2:
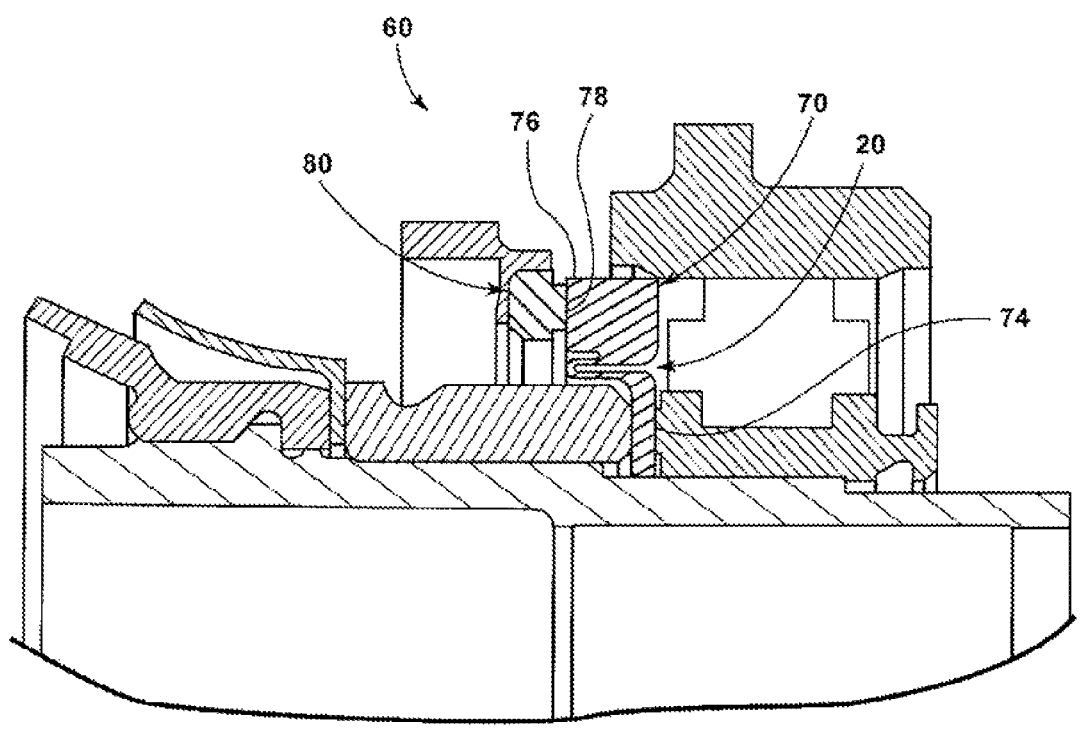
FIG. 2 illustrates a cross-sectional view of a coning-resistant rotor according to an embodiment which is generally shown in a sealing assembly environment.

FIG. 2 generally illustrates a cross-sectional view of an embodiment of a coning-resistant rotor 70 that is generally shown in a sealing assembly environment, e.g., a seal ring assembly 60. The illustrated rotor 70 includes a rotor base 74 and a rotor head 76 having a rotor face 78. During operation, a seal ring 80 may rest in close proximity to a rotor face 78, which may result in viscous or friction heat generation during relative rotation therebetween. The heat generation may cause or establish a temperature gradient through the rotor head 76, which may result in some degree of thermal distortion of the rotor 70. The axially-extending web 20 can help minimize the distortion (including under use/dynamic conditions) by, inter alia, creating a more involved or torturous path to the rotor base, which may in turn better maintain the rotor head 76 in a more isothermal condition.

Figure 3:
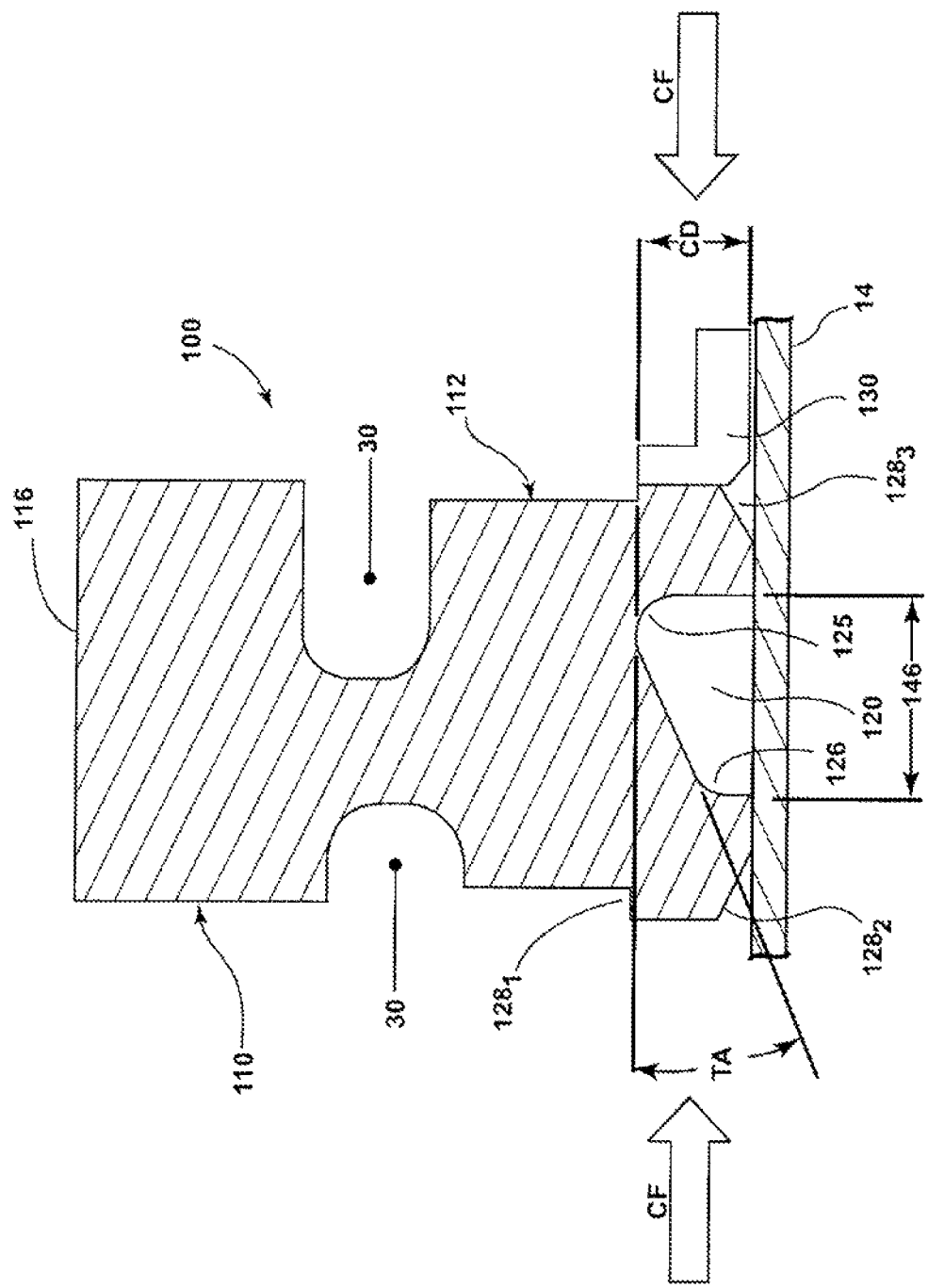
FIG. 3 illustrates a cross-sectional graphical representation of a coning-resistant rotor according to an embodiment of the disclosure.

FIG. 3 generally illustrates a cross-sectional graphical representation of a coning-resistant rotor assembly 100 according to an embodiment of the disclosure. The assembly 100 includes a rotor base 112 and a rotor head 116 having a rotor face 110. As generally illustrated, an axial, or axially-directed, clamping force/load (CF) may be applied to the front and rear of the rotor base 112. With conventional rotor bases, clamping force (CF) may result in a distortion of the rotor face 110, which can cause the rotor face to go out of square with the axis of rotation and/or a warping of the sealing surface associated with rotor face 110. The base 112 may also include at least one angled, tapered, and/or curved portion (e.g., $128_1$, $128_2$, and $128_3$ generally depicted in FIG. 3). The inclusion of one or more portions $128_1$, $128_2$, and $128_3$ in the base 112 can provide various desired structural and/or operational characteristics.

In embodiments, a channel 120 may be provided (e.g., machined, cast, or formed) into or in connection with an inside diameter surface of the rotor base 112, and may include a taper (for example, a taper at taper angle TA as illustrated). With the inclusion of such a channel and taper, it is possible to significantly or materially adjust (or "tune") the rotor face coning to a proper or acceptable flatness for a specific or anticipated application. For some embodiments, the rotor and channel may be configured such that the channel may essentially provide a spring effect that in turn can reduce or eliminate coning and provide improved rotor sealing. Moreover, by adjusting the channel depth CD and/or the taper angle TA, the associated rotor face 110 flatness may be adjusted and/or optimized, and can, among other things, remove or eliminate distortion associated with a static clamp load. That is, for certain embodiments, a channel 120 (which may include a taper) may be configured such that under anticipated conditions (i.e., during assembly and/or operation) the sealing surface of a rotor face 110 is substantially insensitive (from an operational/functional perspective) to an associated clamping load and/or environment.

By way of example only, and without limitation, for some embodiments a channel 120 may have a maximum channel depth (maximum value of CD) of about 0.250 inches±0.050 inches, and an axial length 146 of about 0.300 inches±0.050. Moreover, for some embodiments, also for example and without limitation, the taper angle TA associated with channel 120 may be about 20°±10°. For a number of embodiments, particularly those involving higher clamp loads, corner areas (e.g., 125, 126) of the channel 120 may be generally rounded (as opposed to relatively sharp). The "rounding" of such portions of the channel can, among other things (such as potentially improving ease of manufacture) be configured to additionally help control anticipated stresses associated with the rotor and assembly.

For some applications, or if required, the taper angle TA may be altered in the opposite direction (e.g., the taper high point in the rear rather than in the front of the rotor). Such an alteration may, among other things, adjust seal face coning in the opposite direction. The initial coning and corrected coning may be assessed and predetermined using, for example, finite element analysis techniques.

With the instant embodiment, the inner diameter surface of the base portion including a channel 120 may be configured or "tailored" to weaken the structure to a measured degree. Such desired or intentional "weakening" can allow an anticipated or intended clamping force (CF) to create a bending moment in the rotor (mating ring) near and/or in proximity to the rotor shaft 14. Among other things, such a tailored configuration can help avoid transmitting distortion from the clamping force (CF) to the associated sealing surface 110. For some embodiments, the addition of a tapered channel can provide a spring-like effect that can serve to absorb or tune-out a significant measure, or even substantially all, of the potentially detrimental deflection that might otherwise be transferred from adjacent components (i.e., generally "L"-shaped sleeve/spacer 130) to the sealing surface 110.

Figure 4:
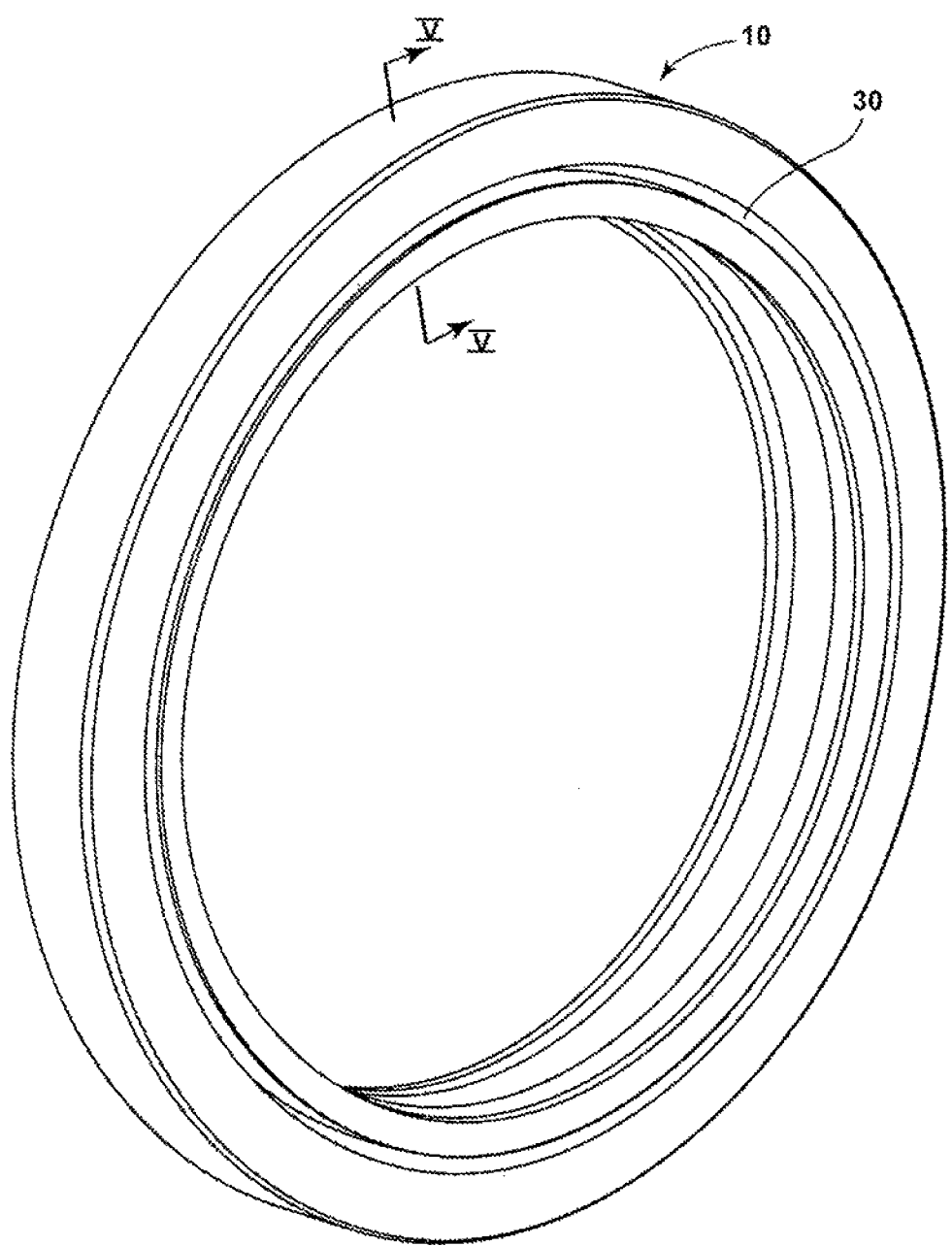
FIG. 4 illustrates a perspective view of a coning resistant rotor according to an embodiment of the disclosure.
Figure 5:
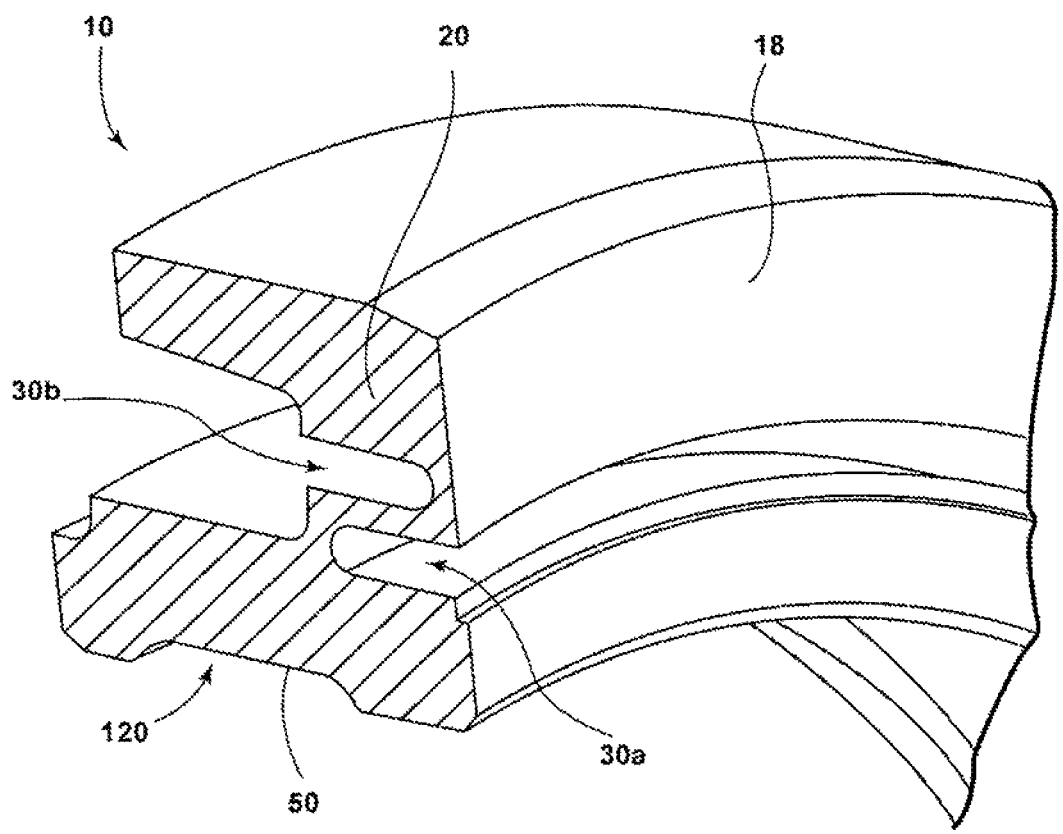
FIG. 5 illustrates a cross-sectional perspective view of a coning resistant rotor viewed at section v-v of FIG. 4.

FIGS. 4 and 5 generally illustrate a perspective view representation and a cross-sectional view, respectively, of a coning-resistance rotor 10. The rotor 10 may include one or more axially-extending circumferential grooves of the type previously noted. In the illustrated embodiment, the rotor 10 is shown including two axially-extending grooves 30a and 30b. As generally illustrated, the coning-resistant rotor 10 may additionally include a channel 120, which may further include a taper. The channel 120 is not limited to that disclosed and may, for example and without limitation, be configured as previously disclosed in connection with the embodiment generally shown in FIG. 3.

While several different embodiments have been disclosed, it is noted that for a given application one or more of the disclosed features may be employed. For example, for some situations, depending on conditions (e.g., load conditions), aspects of several disclosed features disclosed herein with different embodiments may be employed in combination, and may address both static and dynamic load conditions. By way of example, and without limitation, for some applications, a rotor may be configured to include both an axially-extending web interposed between a rotor base and a rotor head, the web including axial web regions 26 and radial web regions 28 defined by at least one circumferential groove 30; and including a channel 120 on an inner diameter 50, the channel 120 having a tapered configuration.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

What is claimed:

1. A coning-resistant rotor for a seal assembly, the rotor comprising:
    a rotor base;
    a rotor head; and
    an axially-extending web formed from a uniform material and interposed between the rotor base and the rotor head, the axially-extending web including at least one front axially-extending circumferential groove formed into the web from a front direction and at least one rear axially-extending circumferential groove formed into the web from a rear direction of the rotor; wherein the front axially-extending circumferential groove and the rear axially-extending circumferential groove are at least partially offset in a radial direction and at least partially overlap each other in an axial direction;
    wherein the axially-extending web comprises a front axial web region, a rear axial web region, and at least one radial web region each of which is formed, at least in part, by at least one of the at least one front axially-extending circumferential groove and the at least one rear axially-extending circumferential groove.

2. The rotor of claim 1, wherein the at least one radial web region is disposed radially between the at least one front axially-extending circumferential groove and the at least one rear axially-extending circumferential groove, and the front axial web region and the rear axial web region are disposed at opposing ends of the at least one radial web region.

3. The rotor of claim 1, wherein the at least one front axially-extending circumferential groove is formed into the web from a front portion of the rotor.

4. The rotor of claim 1, wherein the at least one rear axially-extending circumferential groove is formed into the web from a rear portion of the rotor.

5. The rotor of claim 1, wherein the at least one front axially-extending circumferential groove is formed into the web from a front portion of the rotor, and the at least one rear axially-extending circumferential groove is formed into the web from a rear portion of the rotor; and the at least one front axially-extending circumferential groove is disposed radially closer to a rotor shaft than the at least one rear axially-extending circumferential groove.

6. The rotor of claim 5, wherein the at least one front axially-extending circumferential groove formed into the web from a front portion of the rotor and the at least one rear axially-extending circumferential groove formed into the web from a rear portion of the rotor are provided at different radial positions relative to each other.

7. The rotor of claim 5, wherein the at least one front axially-extending circumferential groove formed into the web from the front portion of the rotor and the at least one rear axially-extending circumferential groove formed into the web from the rear portion of the rotor have a different size, a different shape, or both a different size and different shape.

8. The rotor of claim 1, wherein, viewed in cross-section, the web has a substantially "S"-shaped configuration.

9. The rotor of claim 1, wherein the rotor base includes a channel provided at the inner diameter of the rotor base.

10. The rotor of claim 9, wherein the channel includes a taper.

11. A coning-resistant rotor for a seal assembly, the rotor comprising:
    a rotor head,
    a rotor base connected to the rotor head,
    a front axially-extending circumferential groove and a rear axially-extending circumferential groove,
    the rotor base including an inner diameter surface;
    wherein the inner diameter surface includes at least one channel configured to be adjacent to a rotor shaft, the at least one channel including a continuous taper extending substantially from one axial end of the at least one channel to the other axial end of the at least one channel.

12. The rotor of claim 11, wherein the at least one channel has at least one rounded corner area.

13. The rotor of claim 11, wherein a taper angle is between 10 degrees and about 30 degrees.

14. The rotor of claim 11, wherein the at least one channel has a maximum channel depth between 0.2 inches and about 0.3 inches.

15. The rotor of claim 11, wherein the at least one channel has an axial length between 0.25 inches and about 0.35 inches.

16. The rotor of claim 11, further comprising an axially-extending web interposed between the rotor base and the rotor head, wherein the web includes at least one axial web region and at least one radial web region.

17. The rotor of claim 11, wherein the at least one channel has a radial length on a front axial end of the at least one channel that is greater than the radial length on a rear axial end of the at least one channel.

18. The rotor of claim 11, wherein the front axially-extending circumferential groove and the rear axially-extending circumferential groove are at least partially radially offset.

19. A method for tuning a rotor in connection with a rotor assembly, comprising:
    providing a rotor, comprising:
        a rotor head;
        a rotor base; and
        an axially-extending web formed from a uniform material and interposed between the rotor head and the rotor base, the web including two axially-extending circumferential grooves at least partially overlapping each other in an axially direction, the axially-extending web including a radial web region, a front axial web region connecting the radial web region to the rotor head, and a rear axial web region connecting the radial web region to the rotor base;
    tuning or tailoring a configuration, a position, or both the configuration and the position of at least one of the axially-extending circumferential grooves to adapt structure of the rotor for an operational environment.

20. The method of claim 19, wherein the tuning or tailoring includes modifying a geometry of the at least one of the axially-extending circumferential grooves.

21. The method of claim 19, wherein the rotor base has an inner diameter, and the inner diameter includes a channel having a taper.

22. The method of claim 21, wherein the tuning or tailoring includes modifying a geometry of the channel.

23. The method of claim 22, wherein the tuning or tailoring a geometry includes modifying the taper.

24. The method of claim 19, wherein the tuning or tailoring involves a finite element analysis.

* * * * *